Patented Mar. 22, 1927.

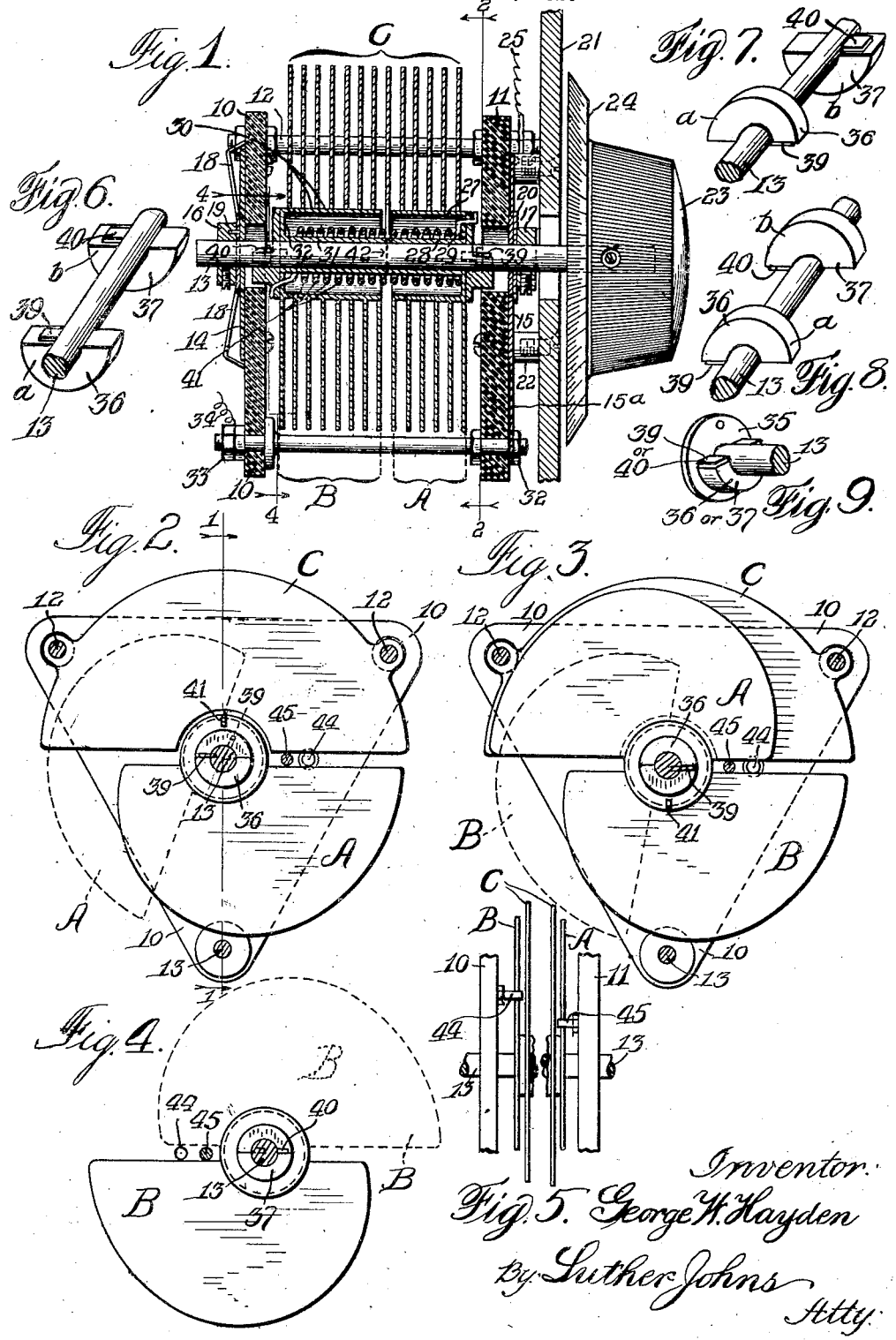

1,621,721

UNITED STATES PATENT OFFICE.

GEORGE W. HAYDEN, OF OAK PARK, ILLINOIS.

VARIABLE CONDENSER.

Application filed April 16, 1926. Serial No. 102,381.

The present improvements relate more particularly to electrostatic condensers of the movable-plate type according to which the capacitance, capacity, or condenser effect is increased or decreased according to the amount or extent of overlap between plate elements of one series and opposed plate elements of another series.

These improvements have a valuable application in connection with radio broadcasting and receiving instruments of various kinds.

The prime object of the present invention is to provide an electrostatic condenser of unusual efficiency both with respect to its delicacy or critical refinement of operation in adding or subtracting capacity and with respect to the scope or range of frequencies (low to high) in connection with which it may be used. It is an object to provide a variable condenser according to which the increment of condenser effect may at all stages be notably small with a given amount of rotor movement, and which, nevertheless, will provide a total capacity, capacitance or condenser effect as large as may be desired.

It is an object to provide a condenser of the plate type having stator and rotor elements according to which the rotor elements are moved through substantially three hundred and sixty degrees to develop the full condenser effects, as distinguished from the well-known plate condensers which provide their full condenser effects respectively through a rotor movement of substantially one hundred and eighty degrees, and to provide a device having so large an amount of rotor movement without sacrificing condenser-plate surface.

It is an important object to provide results such as the foregoing in a device which is of simple construction, which is strong and durable, not likely to get out of order, and which for any given total capacity desired may be relatively small and compact; and also to provide a construction which may be formed cheaply and expeditiously and assembled according to simple and well-understood mechanical operations, which may easily be taken apart as occasion may suggest, and which has appropriate features of adjustment for the suitable spacing of the rotor and stator elements.

Still other objects and advantages will appear hereinafter.

From the drawings it will be observed that in some of the relative positions of parts the condenser illustrated has a general and superficial appearance like that of the one-hundred-and-eighty-degree electrostatic condensers well known and referred to hereinabove. According to these improvements, however, there are two rotors instead of merely one, and the present device develops its condenser effects through a movement of first one and then the other of the rotors to develop the full condenser effects of both, and, conversely, one rotor is first withdrawn from intermeshing relation with the stator followed by a withdrawal of the other rotor from such relation; and the construction is such that a finger-piece connected directly with the operating shaft moves continuously in one direction through substantially three hundred and sixty degrees, whether that direction be for intermeshing the plates or separating them. The construction is further such that the second series of rotor plates to overlap stator plates is the first to emerge from the stator plates, whereby the first rotor to enter the stator may have a smaller number of plates than those of the other rotor, or such first-entering stator plates may be reduced in area, either as a whole or successively, to the effect that a notably small amount of condenser effect may be developed in the initial movements, and with the further advantage that these initial movements may be carried through substantially one hundred and eighty degrees, thus providing for exceedingly fine variations of capacitance throughout the range of the shorter wave lengths in radio practice. The construction is such also that an unusually large amount of capacity effect may be developed through very small and gradual increments in a substantially small and compact device.

It will assist the understanding of the following detailed description to state at this place also that according to the condenser illustrated a coil spring under some torsional tension has its opposite ends in driving relation to the two rotors tending to move them in opposite directions; that movement of what I will call rotor B under the spring action is inhibited by a fixed stop while such movement of rotor A is restrained by a movable stop on the shaft; that sufficient friction is applied to the shaft to maintain it against movement by the spring; that by turning the shaft against the holding effect of the friction means the movable stop is moved so that rotor A is permitted to move under spring pressure, to the effect that as the dial on the shaft is moved the spring pressure carries rotor A into the stator; that thereupon a continued movement of the finger-piece, against the holding action of the friction means, positively moves rotor B into the stator, and at the same time puts the spring under the same amount of tension that it was relieved of when rotor A fully entered the stator; that on the reverse movement of the finger-piece this stored-up energy in the spring acts to move rotor B out of overlapped relation with stator plates to such effect that when the dial has been moved back through one hundred and eighty degrees, always against the holding effect of the friction means, this spring action upon the second rotor causes it to follow back through one hundred and eighty degrees, out of the stator, and until it again contacts the fixed stop; that thereupon a continuation of the reverse movement of the dial causes the movable stop means between rotor A and the shaft to become effective in moving rotor A positively out of the stator, again placing the torsion spring under tension.

In the drawings Figure 1 is a vertical section as on the line 1—1 of Fig. 2 with the several plates in the full-line positions respectively shown in Fig. 2; Fig. 2 is a sectional view as on the line 2—2 of Fig. 1; Fig. 3 is a view similar to Fig. 2 showing one rotor moved through one hundred and eighty degrees into the stator; Fig. 4 is a fragmentary sectional view as on the line 4—4 of Fig. 1; Fig. 5 is a fragmentary top view designed to show the coaction of certain stop members with the respective rotors; Figs. 6, 7 and 8 are perspectives of certain elements drawn with a view to illustrating a peculiar mechanical movement involved in the condenser as illustrated; and Fig. 9 is a fragmentary perspective of one of the elements shown in the three preceding figures, in the form in which it is illustrated in Figs. 1 to 4 inclusive.

The condenser illustrated is shown as comprising a frame having two triangular end pieces of insulating material 10 and 11, say of bakelite or hard rubber, connected by two upper metallic posts 12 and a lower metallic post 13, these posts having nuts thereon holding the parts rigidly together. The shaft 13 extends through a substantially large opening in each of the frame walls 10 and 11, and is mounted for rotation in a pair of bearing plates 14 and 15 secured as by screws to these insulating walls respectively. Adjustable collars 16 and 17, each having a set screw for holding it in a given position of adjustment, provide against longitudinal movement of the shaft when the device is normally in use.

A double-arm leaf spring 18 is medially bored to accommodate the shaft and is positioned between the collar 16 and the plate 14, the spring being carried for revolution with the shaft by the pin 19. This spring 18 has its bent-inward free ends extending beyond and clear of the plate 14 and these ends press upon the outer flat surface of the insulation piece 10 and provide friction serving as a brake upon the shaft so that its rotative movements are at all times subject to some frictional resistance. A washer 20 is shown between the collar 17 and the plate 15.

The device as a whole is shown as being held upon a panel 21 by several screws passing therethrough and entering spacing collars 22. A handwheel or knob 23 having a dial 24 is in the usual arrangement at the operative end of the shaft.

Secured in fixed relation to the frame is a stator which as a whole I have denominated C. This stator comprises a plurality or series of flat plates of substantially semicircular formation, well shown in Figs. 2 and 3. These figures also show that the upper rods or posts 12 pass through small ears marginally located and integral with the stator plates, and it will be understood that these stator plates are held on the two posts 12 spaced apart and side by side and are in fixed relation to the frame, and that they are also in good electrical connection with the rods 12 whereby a wire 25 (Fig. 1) secured to a connection on one of the rods 12 will simultaneously place all of the stator plates in communication with one side of the circuit.

Mounted on the shaft are two rotors which are designated A and B. The rotor A is shown as comprising six plates while the rotor B is shown as having eight plates. The plates of these rotors A and B are of the semi-circular type also but are shortened at the side first to enter the stator, which is in accordance with common practice in that respect to provide for a more gradual increment or decrement of condenser effect with a given dial movement in the earlier stages, or through the range of the lower signal frequencies in radio work.

It may be mentioned at this place that the shape of the rotor plates and that of the stator plates may be varied within wide limits according to particular purposes to be achieved.

The plates of rotor A are shown as being secured as by brazing, upon a hollow drum 27 which has a tubular central sleeve-like bearing part 28, and the shell 27 and sleeve 28 are held in fixed relation to each other by an end wall 29. The arrangement of the plates of stator A is such that when this rotor is moved into the stator the stator and rotor plates will be spaced apart to provide an air dielectric between the opposed plate surfaces, after the manner of the ordinary movable plate condenser.

Rotor B includes a shell 30 similar to shell 27, an inner bearing tube 31, and an end wall 32 forming a rigid support for the plates. The plates of rotor B are arranged similarly to overlap stator plates in spaced relation when rotor B moves into the stator.

Since both rotors are mounted with a nice sliding fit upon the shaft, and since the shaft is in frictional communication also with its bearing members 14 and 15, it is only necessary to connect one or both of these bearing members with the bottom frame post 13 to make good electrical communication with both of the rotors. To this end I have shown the plate 15 as being extended at 15ª into communication with the nut 32 on the post 13, and a binding nut 33 at the other end of this post forms a convenient means for securing a wire as 34 in communication with the rotors.

Rigidly secured at the outer and closed ends of each of the drums 27 and 30 is a pressure-transmitting member shaped as shown in Fig. 9. It has a disc-like part 35 and a substantially half-cylindrical part given the number 36 as to the one fixed to the drum 30 and 37 as to the one secured to the drum 27. The shaft 13 extends loosely through each of them centrally for movement relative thereto.

Each of these semi-circular or half-collar-like parts 36 and 37 (Fig. 9) terminates in substantially diametrically disposed flat ends or surfaces adapted to be engaged by a pin 39 for one and 40 for the other shown as rectangular in shape and which is rigid with and projecting laterally from the shaft 13. Looking at Fig. 9 it is evident that if the shaft 13 were turned in the clockwise direction the pin 36 or 37 would swing over and contact the opposite seat on the half-round member, or that, if the shaft were held stationary the member 35—36 or 35—37 could be turned on the shaft bodily in the anti-clockwise direction through substantially one hundred and eighty degrees until the pin was contacted by the opposite seat, or that, further, if the shaft 13 were held yieldingly and the member 35—36 were under rotative spring pressure to move it in the clockwise direction by a spring not strong enough to move the shaft alone, and that the shaft is then turned by hand in the clockwise direction, the member 35—36 would become freed for turning movements under the spring pressure. The pin on the shaft 13 at one end is marked 39 and at the other end 40.

A coiled torsion spring 41 has its one end in driving relation to rotor A and its opposite end in driving relation to rotor B. It occupies space within the hollow interior of the drums. Its length is such and its ends are secured in such manner as to elongate the spring slightly so as to draw the rotors toward each other and maintain them in such predetermined relation to each other. Such drawing power maintains the ends of the bearing sleeves 28 and 31 in abutment with each other at the dotted line 42 of Fig. 1.

The rotors as a whole may not move longitudinally of the shaft because the pins 39 and 40 ride against the outwardly directed flat surface of the discs 35 respectively, as will be clear from Fig. 9, it being understood that these pins 39 and 40 are rigid with the shaft. Should it be desired to move the rotors longitudinally of the shaft, as for equalizing the space between adjacent rotor and stator plates, this may be accomplished in the device illustrated by adjusting the shaft longitudinally by means of the adjustable collars 16 and 17.

With both rotors out of the stator, which is the condition at the beginning of operations as I am now proceeding to describe them, and which is the condition shown by Figs. 1 and 2, the torsion spring 41 has sufficient torsional spring action to carry one of the rotors through one hundred and eighty degrees, and in all of the figures it is to be understood that the spring 41 is exerting such torsional spring action. The torsion spring was initially given sufficient winding-up twist for this purpose. This spring action is such as to tend to move rotor A in the clockwise direction as viewed from the dial or as viewed in Figs. 2 and 3, and its tendency then is also such as to move rotor B in the anti-clockwise direction. Such anti-clockwise movement of rotor B at this time is prevented by a stop 44 on the frame part 10, well shown in Fig. 5, in which figure the plate B is tending to move toward the person viewing the figure, or in the anti-clockwise direction as viewed from the right. Figs. 2 and 3 also show this stop 44, and Fig. 3 shows rotor B as pressing against that stop in its effort to move anti-clockwise. In Fig. 1 the stop is shown by dotted lines within the area of the shaft.

It is evident that in practice the rotors must be in condition to be moved at all times as slowly and as gradually as the operator may desire, and that each rotor shall remain as adjusted by the operator. Rotor A is not provided with a positive stop to prevent its initial movements. A stop is provided, however, to limit its movement to one hundred and eighty degrees from its initial position shown in Figs. 1 and 2, and I may described this feature at this place. Turning to Fig. 5 we see a stop 45 secured to wall 11 and in the path of one plate of rotor A. If plate B is trying to move anti-clockwise then plate A is trying to move clockwise under the action of the torsion spring, and such movement would carry plate A away from the stop 45 as viewed in Fig. 5. Turning to Fig. 3 we see that rotor A contacts this stop 45 after a movement of one hundred and eighty degrees.

Means must be provided, however, to prevent rotor A from moving through that one hundred and eighty degrees under the torsional spring action, and the means provided according to the illustration are frictional in nature and include the spring 18 carried by the shaft and pressing against the smoothly-surfaced plate 10. It is clear that such friction will necessitate the application of a little force upon the finger-wheel in order to turn the shaft. If, then, there be a connection between rotor A and the shaft of such nature that the torsion of the spring will be communicated to the shaft, the desideratum will have been attained of providing yielding means which may be moved by hand whereby the spring action may come into effect to move rotor A automatically, that is, by spring pressure through the one hundred and eighty degrees desired for rotor A.

Consider now the illustration in Fig. 9 and let us conceive that it illustrates the pressure-applying member associated with rotor A. The tendency of the spring in such instance is to move the member 35—36 in the clockwise direction. But the pin 39 is blocking that movement and the pin is rigid with the shaft and the shaft is being held by friction. We will conceive further that the friction provided by the spring 18 is just a little more than enough to keep the torsion spring from moving the rotor A. Now if we will consider the shaft 13 of Fig. 9 to be turned in the clockwise direction it will be clear that the pin 39 will swing to the right and get out of the way of the half-round or yielding stop member 36 and that the latter will follow right along after it, and this movement will continue until rotor A has turned through one hundred and eighty degrees under spring action, or until it comes into its relative position shown in Fig. 3, at which time rotor A will contact the fixed stop 45 and will not be able to move any farther. It should not move any farther because at such time it is completely enmeshed or in overlapped relation with the series of stator plates appropriated to it.

Thus far we have seen that the operator will turn the dial in the clockwise direction one hundred and eighty degrees, or substantially that amount, and that during such turning movement rotor A automatically turns through one hundred and eighty degrees and fully into the stator. Let us next see how rotor B is turned into the stator.

From Fig. 1 it will be observed that these pressure-applying members 36 and 37 are in the same arrangement on the shaft, that is, one is in the axial projection of the other. Fig. 6 illustrates the initial relative position of these elements. The several actions will be clear from a description in connection with Figs. 6, 7 and 8. In these figures corresponding parts are given the same reference numerals, and, since the rotors A and B of the main figures have the same movements as the half-round elements 36 and 37 respectively, I will also designate these elements as rotors $a$ and $b$ to simplify the description and explain the results in the complete device.

Considering Figs. 6, 7 and 8 we are to understand that the torsion spring 41 is connected to the members 36 and 37 the same as in Fig. 1. I have already described how on turning the shaft 13 of Fig. 6 the pin 39 will swing over permitting rotor $a$ to follow through one hundred and eighty degrees. It remains to be pointed out that at the same time the pin 40 has swung around an equal distance through the open space provided by the segmental nature of the half-round part 37. We have also observed that the fixed stop 44 (Fig. 5) prevents rotor $b$ from turning in the anti-clockwise direction. Rotor $b$ remains in its initial position therefore during this one-hundred-and-eighty-degree movement of rotor $a$, and at the end of this one-hundred-eighty-degree movement the parts are in the relative positions shown by Fig. 7.

It is clear from Fig. 7 that pin 40 is now in driving relation to the segment $b$, and it is only necessary to continue the movement of the shaft in the same direction, and through another one hundred and eighty degrees to drive segment $b$ through one hundred and eighty degrees. Let us conceive that that has been done, in which case both pins 39 and 40 will move through such one hundred and eighty degrees, pin 40 driving rotor $b$ around and pin 39 swinging around freely in the open space provided. At the end of that movement the parts will be in their relative positions shown by Fig. 8.

At this place it may be stated that when rotor B is moved through one hundred and eighty degrees, such movement is against the pressure of the torsion spring and winds that spring up an amount equal to that of which it was relieved when rotor A was moved by the spring one hundred and eighty degrees.

Turning now to Figs. 2 and 3 we will follow this same series of movements on the condenser illustrated. Fig. 2, like Fig. 1, shows both rotors out of engagement with the stator. Turning the shaft 13 in the clockwise direction allows rotor A to move by spring action into its full-line position in Fig. 3 where it is stopped by pin 45. The dotted-line position in Fig. 2 shows rotor A at a stage of this movement. The position of the rotors and associated parts in Fig. 3 corresponds to those shown in Fig. 7. The dotted-line position of rotor B in Fig. 3 shows it advancing also into the stator and shows a movement which if continued would carry rotor B exactly into the axial projection of rotor A of Fig. 3, that is, into fully overlapped relation with the stator, and the several parts would be in the relative positions shown by Fig. 8, at which time rotor B is stopped by the pin 44, and at which time the dial has moved through substantially three hundred and sixty degrees, and by a movement which at all stages continued in the same clockwise direction.

Let us next see what happens on the reverse movement of the knob and dial.

Turning to Fig. 8 it is clear that if the shaft 13 be turned in the anti-clockwise direction both pins 39 and 40 will swing to the right without moving either rotor A or B. Let us keep in mind that the torsion of the spring 41 is such as to move rotor a in the clockwise direction and to move rotor b in the anti-clockwise direction. From Fig. 3 note that when fully in the stator the rotors are resting on top of the pins 44 and 45 respectively. Rotor A may not move in the clockwise direction because of pin 45. Rotor B has no inclination to move in that direction, but the torsion spring is tending to move it in the opposite direction or away from pin 44. Nothing prevents such movement except that the pin 40, Fig. 8, is in its path, and the frictional tension on the shaft, as already explained, is enough to prevent the torsion from driving the rotor b of Fig. 8 or the rotor B of Fig. 3. Turning the shaft 13 anti-clockwise, however, takes the pins 40 out of such holding relation so that rotor b or B may follow back by spring pressure through one hundred and eighty degrees, and then the parts will again be in the position shown by Fig. 7, and at which time, turning to Fig. 5, rotor B is stopped by pin 44. Turning to Fig. 7 again it is clear that pin 40 may move a further one hundred and eighty degrees through the open space provided by the segmental construction and that pin 39 is now in position to exert driving force upon rotor a, so that if the reverse movement be continued through one hundred and eighty degrees we will find the parts in the relative position shown by Fig. 6, which is where they were at the beginning of operations. Applying the same description to the condenser illustrated in the major figures the rotors A and B will then be in their full-line relative positions shown by Fig. 2, namely, entirely out of the stator.

One feature of advantage that should be noted is in the fact that rotor B is last to enter the stator and the first to emerge therefrom, a movement which provides that the same condenser effects will be had at any given place indicated on the dial whether the dial movement be forward or in the reverse direction, and whether the number of rotor plates on each rotor be the same or different, and whether the plates of one series be greater or less in area than those of the other series. This provision therefore makes possible an advantageous construction both with respect to the number and shape or area of rotor plates to provide, for instance, for a relatively great movement of the dial, as say through the first one hundred and eighty degrees, to make better tuning possible among the lower wave lengths where the field is particularly crowded.

With respect to the functioning of the device as a whole it is clear that means have thus been provided for developing a given amount of capacity effects through a direct dial movement of substantially three hundred and sixty degrees as against that of substantially one hundred and eighty degrees according to the older practice. This means not only that the operator has a wider range of dial movement, making for convenience in operation, but the further advantage is had of introducing or subtracting a given, say a relatively small, amount of capacity through a relatively great movement of the rotor. The introduced or subtracted capacity is at each stage that of one rotor only, which rotor may have only half or less than half of the total plate surface of both rotors.

With respect to the torsion spring and the friction means for inhibiting its operation it may be mentioned that since these rotors are mounted for easy turning movements on the shaft a very small amount of spring pressure is required to move them, so that a small amount of friction, as by the spring 18, is required to inhibit that motion. The net result is that so far as the operator is concerned he experiences merely a slight and gently-yielding resistance quite suitable for the best operating results. The resistance provided by the spring 18 may be varied, for instance by moving outward the collar 16 slightly, in which case it would be preferable to insert a thin washer between the spring and the bearing plate 14.

While I have thus illustrated and described an embodiment of the present invention in a simple and advantageous form, I am aware of various changes, departures and modifications which may be made in the construction and arrangement of parts within the spirit of the improvements thus set forth, and I contemplate as being included herein all such changes, modifications, departures and variations from what is specifically herein illustrated and described as fall within the scope of the appended claims.

I claim:

1. In an electrostatic condenser of the character described, the combination of a stator having plates side by side and in spaced relation, a rotor having plates side by side, spaced apart, and mounted for overlapping and spaced relation with stator plates, hand-operable means for moving the rotor in one direction and for freeing the rotor for automatic movement in the opposite direction when the hand-operable means are moved in such opposite direction, automatically-operating means for moving the rotor in such opposite direction, and means for holding the hand-operable means yieldingly in a given relative position to hold the rotor against movement by the automatically-operating means.

2. In an electrostatic condenser of the character described, the combination of a stator having plates side by side and in spaced relation, a rotor having plates side by side, spaced apart and mounted for overlapping and spaced relation with stator plates, automatically-operating means under the control of hand-operable means for moving the rotor in one direction, and hand-operable means for moving the rotor in the opposite direction and for controlling the automatic movement of the rotor in the first-mentioned direction.

3. In an electrostatic condenser of the character described, the combination of a stator having plates side by side and in spaced relation, a rotor having plates side by side, spaced apart and mounted for overlapping and spaced relation with stator plates, automatically-operating means under the control of hand-operable means for moving the rotor in one direction, and hand-operable means for moving the rotor in the opposite direction and for controlling the automatic movement of the rotor in the first-mentioned direction, said automatically-operating means being controlled by said hand-operable means by means including friction means applied to the hand-operable means.

4. In an electrostatic condenser of the character described, the combination of a stator having plates side by side and in spaced relation. a rotor having plates side by side, spaced apart and mounted for overlapping and spaced relation with stator plates, spring means for moving the rotor in one direction, hand-operable means for moving the rotor in the opposite direction, and means associated with the hand-operable means for controlling by said hand-operable means the movement of the rotor by said spring means.

5. In an electrostatic condenser of the character described, the combination of a stator having plates side by side and in spaced relation, a rotor having plates side by side, spaced apart and mounted for overlapping and spaced relation with stator plates, a coil spring on the axis of the rotor for moving the rotor in one direction, hand-operable means for moving the rotor in the opposite direction, and means associated with the hand-operable means for controlling by said hand-operable means the movement of the rotor by said spring means.

6. In an electrostatic condenser of the character described, the combination of a stator having plates side by side and in spaced relation, a rotor having plates side by side, spaced apart and mounted for overlapping and spaced relation with stator plates, a coil spring on the axis of the rotor for moving the rotor in one direction, hand-operable means for moving the rotor in the opposite direction, and means including friction means associated with the hand-operable means for controlling by said hand-operable means the movement of the rotor by said coil spring.

7. In an electrostatic condenser of the character described, the combination of a stator having plates side by side and in spaced relation, a rotor having plates side by side, spaced apart and mounted for overlapping and spaced relation with stator plates, spring means for moving the rotor in one direction, hand-operable means for moving the rotor in the opposite direction and for limiting, step by step, the movement of the rotor by said spring means, and friction-applying means for holding the hand-operable means yieldingly against the spring pressure communicated to it by said spring means.

8. In an electrostatic condenser of the character described, the combination of a stator having plates side by side and in spaced relation, a rotor having plates side by side, spaced apart and mounted for overlapping and spaced relation with stator plates, spring means for moving the rotor in one direction, hand-operable means for moving the rotor in the opposite direction and for limiting, step by step, the movement of the rotor by said spring means, and friction-applying means for holding the hand-operable means yieldingly against the spring pressure communicated to it by said spring means, said friction-applying means including a spring and adjustable means for increasing and decreasing the tension thereof.

9. In an electrostatic condenser of the character described, the combination of a plurality of rotors, each rotor comprising a series of plates side by side in spaced relation and each rotor being mounted for movement independent of that of the other, a series of stator plates for each rotor, the stator plates of each series being side by side and spaced apart and positioned whereby each rotor may have an overlapping and spaced-apart relation to its own series of stator plates, and unitary means for moving first one of the rotors independently of the other and then the other independently of the first into such overlapped relation with the respective series of stator plates.

10. In an electrostatic condenser of the character described, the combination of a plurality of rotors, each rotor comprising a series of plates side by side in spaced relation and each rotor being mounted for movement independent of that of the other, a series of stator plates for each rotor, the stator plates of each series being side by side and spaced apart and positioned whereby each rotor may have an overlapping and spaced-apart relation to its own series of stator plates, and means including a single finger-piece for moving first one of the rotors independently of the other and then the other independently of the first into such overlapped relation with the respective series of stator plates.

11. In an electrostatic condenser of the character described, the combination of a plurality of rotors, each rotor comprising a series of plates side by side in spaced relation and each rotor being mounted for movement independent of that of the other, a series of stator plates for each rotor, the stator plates of each series being side by side and spaced apart and positioned whereby each rotor may have an overlapping and spaced-apart relation to its own series of stator plates, and means including a single finger-piece movable continuously in one direction for moving first one of the rotors independently of the other and then the other independently of the first into such overlapped relation with the respective series of stator plates.

12. In an electrostatic condenser of the character described, the combination of a plurality of rotors, each rotor comprising a series of plates side by side in spaced relation and each rotor being mounted for movement independent of that of the other, a series of stator plates for each rotor, the stator plates of each series being side by side and spaced apart and positioned whereby each rotor may have an overlapping spaced-apart relation to its own series of stator plates, and unitary means for moving first one of the rotors through substantially one hundred and eighty degrees and then the other through substantially one hundred and eighty degrees into such overlapped relation with the respective series of stator plates, said last-mentioned means including a shaft common to the two rotors.

13. In an electrostatic condenser of the character described, the combination of a plurality of rotors, each rotor comprising a series of plates side by side in spaced relation and each rotor being mounted for movement independent of that of the other, a series of stator plates for each rotor, the stator plates of each series being side by side and spaced apart and positioned whereby each rotor may have an overlapping spaced-apart relation to its own series of stator plates, and unitary means for moving first one of the rotors independently of the other and then the other independently of the first into such overlapped relation with the respective series of stator plates, said last-mentioned means including a frame holding the stator and the rotors, hand-operable means, and friction means associated with the hand-operable means and said frame.

14. In an electrostatic condenser of the character described, the combination of a plurality of rotors, each rotor comprising a series of plates side by side in spaced relation and each rotor being mounted for independent movement, a series of stator plates for each rotor, the stator plates of each series being side by side and spaced apart and positioned whereby each rotor may have an overlapping spaced-apart relation to its own series of stator plates, and means for moving first one of the rotors and then the other into such overlapped relation with the respective series of stator plates, said last-mentioned means including a frame holding the stator and the rotors, hand-operable means for moving one of the rotors positively, and spring means under the control of the hand-operable means for moving the other rotor.

15. In an electrostatic condenser of the character described, the combination of a stator comprising a plurality of plates side by side and spaced apart, two rotors, each comprising a plurality of plates side by side and in spaced relation, the rotors being mounted on a common axis for independent movement into overlapping and spaced relation with plates of the stator, spring means for moving one rotor into overlapped relation with stator plates, and hand-operable means for moving the other rotor into such overlapped relation against the tension of said spring means.

16. In an electrostatic condenser of the character described, the combination of a stator comprising a plurality of plates side by side and spaced apart, a plurality of rotors, each rotor comprising a plurality of plates side by side and in spaced relation, each rotor being mounted for movement independent of that of the other to bring its plates into overlapping and spaced relation with plates of the stator, with means for moving the rotors sequentially and independently of other rotor movement into overlapped relation with stator plates.

17. In an electrostatic condenser of the character described, the combination of a stator comprising a series of plates side by side and spaced apart, and a plurality of rotors, each rotor comprising a plurality of plates side by side and in spaced relation, each rotor being mounted for independent movement to bring its plates into overlapping and spaced relation with plates of the stator, with means including a shaft on which both rotors are mounted for moving the rotors sequentially into and sequentially out of overlapped relation with stator plates.

18. In a plate electrostatic condenser of the character described, the combination of a stator, two rotors, the rotors being mounted on a common axis for independent movement into overlapping and spaced relation with the stator, spring means for moving one rotor into overlapped relation with the stator, hand-operable means for moving the other rotor positively into such overlapped relation against the tension of said spring means, said spring means being thereupon adapted to move the last mentioned rotor out of overlapped relation with the stator, and means associated with the hand-operable means for moving out of such overlapped relation the rotor first to enter the stator.

19. In an electrostatic condenser of the character described, the combination of a stator comprising a plurality of plates side by side and spaced apart, two rotors, each comprising a plurality of plates side by side and in spaced relation, the rotors being mounted on a common axis for independent movement into overlapping and spaced relation with plates of the stator, with means including spring means operatively connected to both rotors and tending to move the rotors in opposite directions for moving one rotor into overlapped relation with stator plates, and means for moving the other rotor into such overlapped relation against the tension of said spring means.

20. In an electrostatic condenser of the character described, the combination of a stator comprising a plurality of plates side by side and spaced apart, two rotors, each comprising a plurality of plates side by side and in spaced relation, the rotors being mounted on a common axis for independent movement into overlapping and spaced relation with plates of the stator, with means including spring means operatively associated with both rotors and tending to move them in opposite directions for moving one rotor into overlapped relation with stator plates, means for moving the other rotor into such overlapped relation against the tension of said spring means, and means for holding said other rotor yieldingly in a given position while in overlapped relation with stator plates.

21. In an electrostatic condenser of the character described, the combination of a stator comprising a series of plates side by side and spaced apart, and two rotors, each rotor comprising a plurality of plates side by side and in spaced relation, each rotor being mounted for independent movement through substantially one hundred and eighty degrees into overlapping and spaced relation with plates of the stator, with means including a shaft on which both the rotors are mounted for moving first one rotor and then the other through substantially one hundred and eighty degrees and with said shaft moving through substantially three hundred and sixty degrees.

22. In an electrostatic condenser of the character described, the combination of a series of stator plates arranged side by side and in spaced-apart relation, two series of rotor plates mounted on a common axis adjacent to the stator plates, the rotor plates being spaced apart and adapted to have an intermeshing relation with the stator plates and in spaced relation thereto, the stator plates and the rotor plates being so formed and arranged that a rotative movement of substantially one hundred and eighty degrees is required to move either series of rotor plates into such overlapped relation with stator plates, and means operatively associated with each series of stator plates for moving first one series thereof substantially one hundred and eighty degrees into such overlapped relation and for then moving the other series thereof substantially one hundred and eighty degrees into such overlapped relation.

23. In an electrostatic condenser of the character described, the combination of a stator having plates side by side and spaced apart, two rotors, each having plates adapted to intermesh in spaced relation with stator plates, the two rotors being mounted on a common axis adjacent to the stator, spring means operatively between the two rotors, said spring means being under tension tending to cause the rotors to move rotatively in opposite directions, relatively fixed stop means for holding one of said rotors against such movement, and rotatable yielding means for holding the other one of said series against such movement, means for moving said yielding means to permit said other one of said rotors to move rotatively in response to the spring tension and through substantially one hundred and eighty degrees into overlapped and spaced relation with stator plates, with means associated with said yielding means for communicating rotative movement to the other one of said series to move it also and as a sequence of operations through substantially one hundred and eighty degrees into such overlapped and spaced relation with stator plates.

24. In an electrostatic condenser of the character described, the combination of two rotors on a common axis, each comprising a plurality of plates side by side and in spaced relation and each rotor being mounted for independent movement, a series of stator plates for each rotor, the stator plates being side by side and spaced apart and positioned whereby each rotor may have an overlapping spaced apart relation to its own series of stator plates, a coiled torsion spring having its ends in driving relation to both rotors to tend to drive them in opposite directions, a stop for limiting the movement of one of the rotors against the driving action of said spring, a rotatably-mounted stop under the control of the operator for controlling the movement of the other rotor under the spring action of said spring, and friction means for holding said rotatably-mounted stop yieldingly in a given position of adjustment.

25. In an electrostatic plate condenser of the character described, the combination of a frame, a shaft carried by the frame, two rotors mounted loosely on said shaft and for independent movement, a stator adapted to have coaction with both rotors, a coiled torsion spring on said shaft and in driving relation to both rotors and tending to move them in opposite directions, a stop for limiting the spring-impelled movement of one rotor, a stop carried by said shaft for controlling the spring-impelled movement of the other rotor, means for turning said shaft to carry said stop thereon circumferentially whereby said spring may move one of the rotors into the stator, means carried by the shaft for moving the other rotor positively into the stator against the tension of said spring, means carried by said shaft for moving in reverse direction the rotor first to enter the stator, said means being operative thereto after the second rotor to enter the stator has moved out of the stator, and friction means for holding said shaft against movement under the action of said spring.

26. In a plate electrostatic condenser of the character described, the combination of a stator, two rotors, each rotor being mounted for independent movement to bring its plates into overlapping and spaced relation with plates of the stator, spring means for moving one rotor into the stator and for moving the other rotor out of the stator, means for yieldingly holding each rotor in a given position of adjustment intermediate its extreme limits of movement, and hand-operable means for moving one rotor out of and the other rotor into the stator.

27. In a plate electrostatic condenser of the character described, the combination of a stator, two rotors, the rotors being mounted on a common axis for independent movement into overlapping and spaced relation with plates of the stator, a coiled torsion spring operating upon each rotor for moving one rotor into the stator and for moving the other rotor out of the stator, means for yieldingly holding each rotor in a given position of adjustment intermediate its extreme limits of movement, and hand-operable means for moving one rotor out of and the other rotor into the stator.

28. In an electrostatic plate condenser of the character described, the combination of a stator, a plurality of rotors mounted for movement independent of that of the other to bring their respective plates into overlapping and spaced relation with plates of the stator, with means including a shaft on which all the rotors are mounted for moving the rotors sequentially and independently of other rotor movement into overlapped relation with stator plates through a shaft movement of substantially three hundred and sixty degrees.

29. In an electrostatic plate condenser of the character described, the combination of a stator, two rotors mounted on a common axis for independent movement to bring their respective plates into overlapping and spaced relation with plates of the stator, a shaft on which the rotors are loosely mounted, and means including a spring coacting with both rotors for moving the rotors sequentially either into the stator or out of the stator through a movement of the shaft of substantially three hundred and sixty degrees in one direction or the other.

GEORGE W. HAYDEN.